US009203984B2

(12) United States Patent
Nagano

(10) Patent No.: US 9,203,984 B2
(45) Date of Patent: Dec. 1, 2015

(54) COMMUNICATION APPARATUS AND COMMUNICATION SYSTEM

(71) Applicant: KYOCERA Document Solutions Inc., Osaka-shi, Osaka (JP)

(72) Inventor: Daisaku Nagano, Osaka-shi (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/257,880

(22) Filed: Apr. 21, 2014

(65) Prior Publication Data

US 2014/0320911 A1 Oct. 30, 2014

(30) Foreign Application Priority Data

Apr. 24, 2013 (JP) ................. 2013-091230

(51) Int. Cl.
*G06K 15/00* (2006.01)
*H04N 1/00* (2006.01)
*H04N 1/333* (2006.01)
*H04N 1/327* (2006.01)

(52) U.S. Cl.
CPC ....... *H04N 1/00217* (2013.01); *H04N 1/00244* (2013.01); *H04N 1/32765* (2013.01); *H04N 1/33346* (2013.01); *H04N 2201/0093* (2013.01); *H04N 2201/0094* (2013.01)

(58) Field of Classification Search
USPC ............... 358/1.15, 1.9, 1.18, 468, 441, 1.16, 358/404, 1.14
See application file for complete search history.

(56) References Cited

U.S. PATENT DOCUMENTS

| 4,994,926 | A | * | 2/1991 | Gordon et al. | 358/400 |
| 5,265,262 | A | * | 11/1993 | Grube et al. | 455/17 |
| 2007/0115978 | A1 | | 5/2007 | Kondo | |
| 2013/0166703 | A1 | * | 6/2013 | Hammer et al. | 709/220 |

FOREIGN PATENT DOCUMENTS

| JP | 2006067045 A | 3/2006 |
| JP | 2012249217 A | 12/2012 |

* cited by examiner

*Primary Examiner* — Jerome Grant, II
(74) *Attorney, Agent, or Firm* — Alleman Hall McCoy Russell & Tuttle LLP

(57) ABSTRACT

A communication apparatus includes a retry notification portion, a first storage control portion, and a cancellation notification portion. The retry notification portion is configured to notify a transmission-side communication apparatus of a retry time period indicating a standby time period until retry of a communication process requested from the transmission-side communication apparatus, when the communication process is non-executable. The first storage control portion is configured to store identification information of the transmission-side communication apparatus which is a request source of the communication process, into a first storage portion when the communication process is non-executable. The cancellation notification portion is configured to notify the transmission-side communication apparatus corresponding to the identification information stored in the first storage portion, of cancellation of a non-executable state of the communication process when the non-executable state of the communication process is cancelled.

17 Claims, 11 Drawing Sheets

FIG. 5

| No. | TRANSMISSION SOURCE | TIME AND DATE OF RECEPTION |
|---|---|---|
| 1 | 123-456-xxx | 2013/03/25 16:50 |
| 2 | 789-000-xxx | 2013/03/25 17:20 |
| 3 | | |
| 4 | | |
| 5 | | |

FIG. 8

| No. | DESTINATION | RETRY TIME PERIOD (s) |
|---|---|---|
| 1 | 123-456-xxx | INDEFINITE |
| 2 | 789-000-xxx | 0300 |
| 3 | | |
| 4 | | |
| 5 | | |

D2

COMMUNICATION APPARATUS AND COMMUNICATION SYSTEM

INCORPORATION BY REFERENCE

This application is based upon and claims the benefit of priority from the corresponding Japanese Patent Application No. 2013-091230 filed on Apr. 24, 2013, the entire contents of which are incorporated herein by reference.

BACKGROUND

The present disclosure relates to a communication apparatus and a communication system which execute a communication process in accordance with a communication protocol such as SIP (Session Initiation Protocol).

In recent years, for example, SIP (Session Initiation Protocol) is known as a communication protocol in performing a communication process via a communication network such as the Internet and an intranet. SIP is a signaling protocol for an application layer which is defined in RFC 3261. For example, SIP is used for communication processes such as IP-FAX (facsimile), IP phone, video phone, video conferencing, video chat, and instant messenger.

Meanwhile, a technology is known in which, in the case where a reception-side communication apparatus is in an non-executable state when a communication process is executed using SIP, a transmission-side communication apparatus executes the communication process again after elapse of a retry time period received from the reception-side communication apparatus. With this technology, a useless communication process with the reception-side communication apparatus in the non-executable state as a destination is suppressed. It should be noted that examples of the non-executable state include memory fullness, a paper out state, paper jam, and a busy state.

SUMMARY

A communication apparatus according to one aspect of the present disclosure includes a retry notification portion, a first storage control portion, and a cancellation notification portion. The retry notification portion is configured to notify a transmission-side communication apparatus of a retry time period indicating a standby time period until retry of a communication process requested from the transmission-side communication apparatus, when the communication process is non-executable. The first storage control portion is configured to store identification information of the transmission-side communication apparatus which is a request source of the communication process, into a first storage portion when the communication process is non-executable. The cancellation notification portion is configured to notify the transmission-side communication apparatus corresponding to the identification information stored in the first storage portion, of cancellation of a non-executable state of the communication process when the non-executable state of the communication process is cancelled.

A communication apparatus according to another aspect of the present disclosure includes a second storage control portion, a communication prohibition portion, a first prohibition cancellation portion, and a second prohibition cancellation portion. The a second storage control portion is configured to store a retry time period and identification information of a reception-side communication apparatus which is a destination of a communication process, into a second storage portion such that the retry time period and the identification information are associated with each other when the retry time period is received from the reception-side communication apparatus. The communication prohibition portion is configured to prohibit a communication process with, as a destination, the reception-side communication apparatus corresponding to the identification information stored in the second storage portion. The first prohibition cancellation portion is configured to cancel prohibition of the communication process by the communication prohibition portion when the retry time period elapses. The second prohibition cancellation portion is configured to cancel the prohibition of the communication process by the communication prohibition portion when cancellation of a non-executable state is notified of by the reception-side communication apparatus.

A communication system according to another aspect of the present disclosure includes a transmission-side communication apparatus and a reception-side communication apparatus. The reception-side communication apparatus includes the retry notification portion, the first storage control portion, and the cancellation notification portion. The transmission-side communication apparatus includes the second storage control portion, the communication prohibition portion, the first prohibition cancellation portion, and the second prohibition cancellation portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram showing an example of reception information used by the communication apparatus according to the embodiment of the present disclosure.

FIG. 8 is a diagram showing an example of prohibition information used by the communication apparatus according to the embodiment of the present disclosure.

DETAILED DESCRIPTION

[Schematic Configuration of Communication System 1]

Figure 1:
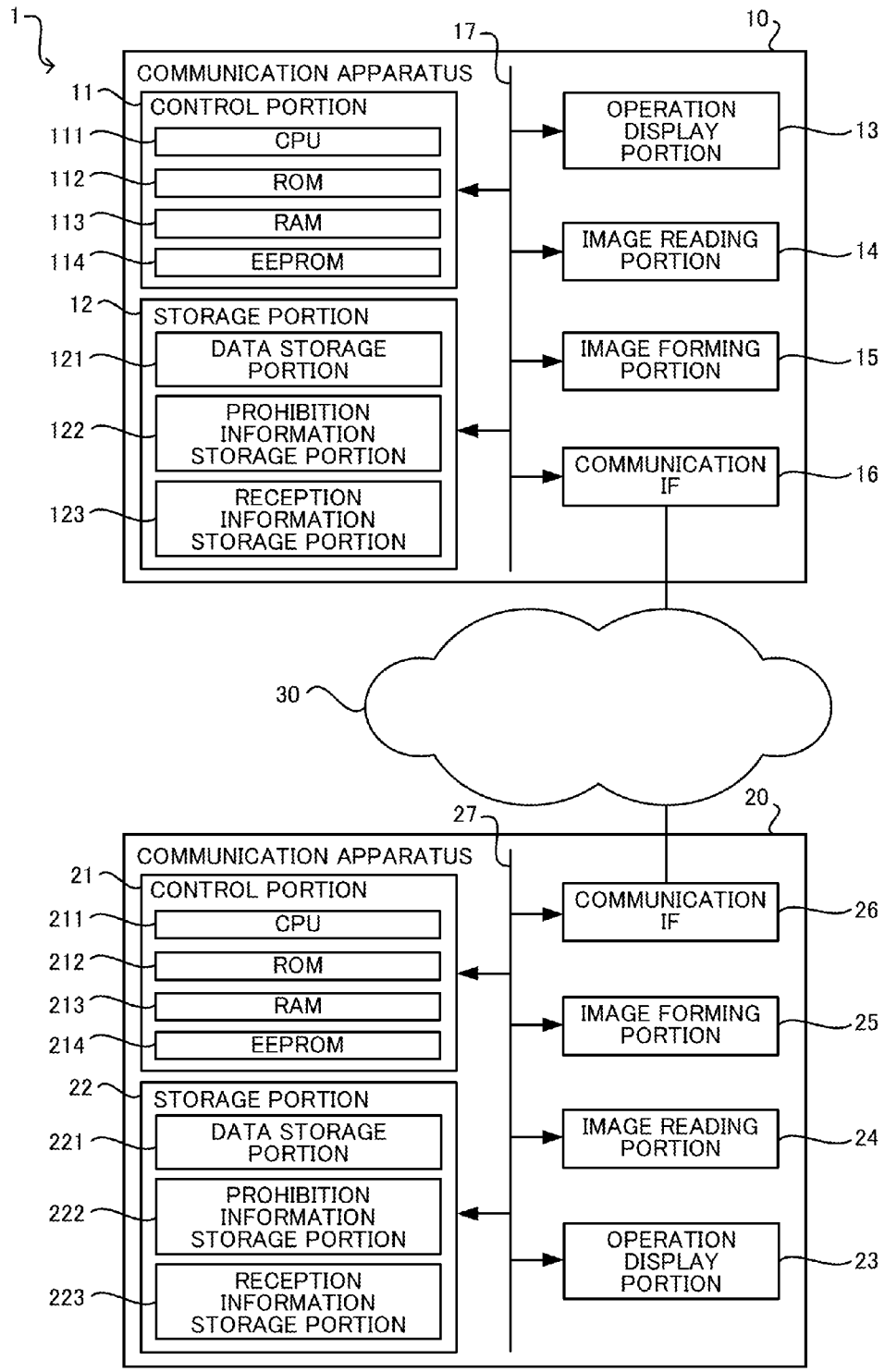
FIG. 1 is a block diagram illustrating a communication system according to an embodiment of the present disclosure.

First, a schematic configuration of a communication system 1 according to an embodiment of the present disclosure will be described with reference to FIG. 1. As shown in FIG. 1, the communication system 1 includes a communication apparatus 10 and a communication apparatus 20. The communication apparatus 10 and the communication apparatus 20 are connected to each other via a communication network 30 in a communicable manner. The communication network 30 is, for example, the Internet, an intranet, a LAN, etc.

As shown in FIG. 1, the communication apparatus 10 is an image forming apparatus which includes a control portion 11, a storage portion 12, an operation display portion 13, an image reading portion 14, an image forming portion 15, a communication IF 16, and the like. The constituent elements provided in the communication apparatus 10 are connected to each other via an internal bus 17. The communication apparatus 10 is a multifunction peripheral which has a FAX function, a copy function, a print function, a scan function, and the like. It should be noted that a printer, a scanner, a FAX apparatus (facsimile apparatus), a mobile phone, a smart phone, a tablet terminal, a personal computer, various home electric appliances, and the like having a communication function are examples of a communication apparatus according to the present disclosure.

The control portion 11 includes a CPU 111, a ROM 112, a RAM 113, an EEPROM 114, and the like. The CPU 111 is a processor which executes operational processing. The ROM 112 is a non-volatile storage portion in which information such as a control program for causing the CPU 111 to execute various processing is previously stored. In addition, the RAM 113 is a volatile storage portion, and the EEPROM 114 is a non-volatile storage portion. The RAM 113 and the EEPROM 114 are used as temporary storage memories (working areas) for various processing executed by the CPU 111. It should be noted that the control portion 11 may be configured as an electronic circuit such as an integrated circuit (ASIC or DSP). In addition, the control portion 11 may include a plurality of control main bodies (processors).

The control portion 11 comprehensively controls the communication apparatus 10 by executing processing by the CPU 111 in accordance with the control program stored in the ROM 112 or the EEPROM 114. For example, the control portion 11 realizes a FAX function of transmitting/receiving image data to/from an external apparatus such as the communication apparatus 20 connected via the communication network 30. In addition, the control portion 11 realizes: a scan function of executing an image reading process of reading image data from a document sheet by the image reading portion 14; a print function of executing an image forming process of printing inputted image data by the image forming portion 15; and the like.

It should be noted that the control program may be recorded in a computer-readable storage medium such as a CD, a DVD, or a semiconductor memory, may be read from the storage medium by a reading device which is not shown, and may be installed into the EEPROM 114 or the storage portion 12. The present disclosure may be understood as disclosure of the control program or a computer-readable storage medium in which the control program is recorded. Furthermore, the present disclosure may be understood as disclosure of a communication method executed in the communication apparatus 10 or the communication apparatus 20.

The storage portion 12 is a non-volatile storage portion such as an HDD (Hard Disk Drive) or an SSD (Solid State Drive) which stores information. The storage portion 12 includes a data storage portion 121 which stores document data such as image data, a prohibition information storage portion 122 which stores later-described prohibition information D2 (see FIG. 8), and a reception information storage portion 123 which stores later-described reception information D1 (see FIG. 5). The data storage portion 121, the prohibition information storage portion 122, and the reception information storage portion 123 are storage areas within the storage portion 12. Here, the reception information storage portion 123 is an example of a first storage portion, and the prohibition information storage portion 122 is an example of a second storage portion. It should be noted that as another embodiment, it is also conceivable that any one or a plurality of the data storage portion 121, the reception information storage portion 123, and the prohibition information storage portion 122 are storage areas within an external apparatus connected via the communication network 30.

The operation display portion 13 includes: a display portion such as a liquid crystal display which displays various information in accordance with control instructions from the control portion 11; and an operation portion which receives a user operation and inputs an operation signal to the control portion 11. For example, the operation portion includes a touch panel which is provided on an upper surface or a lower surface of a display surface of the display portion and detects a touch operation of a user on the display surface of the display portion.

The image reading portion 14 is an image reading portion which applies light to a document sheet placed on a document sheet table or a document sheet conveyed by an ADF (automatic document feeder) and reads reflected light from the document sheet as image data by an image sensor (photoelectric conversion element) such as a CCD. Image data read by the image reading portion 14 is stored into the data storage portion 121 of the storage portion 12. For example, the image data stored into the data storage portion 121 is transmitted in a later-described FAX transmission process or printed out by the image forming portion 15. It should be noted that image data received from the outside in a FAX reception process executed by the control portion 11 is also stored into the data storage portion 121 of the storage portion 12.

The image forming portion 15 is an electrophotographic type image forming portion which includes a photosensitive drum, a charging device, an exposure device, a developing device, a transfer device, a fixing device, and the like. For example, the image forming portion 15 executes an image forming process of forming an image on a sheet such as paper on the basis of image data received through FAX communication executed by the control portion 11.

The communication IF 16 is a communication interface which connects the communication apparatus 10 to the communication network 30 via a wire or wirelessly and executes data communication with an external apparatus such as the communication apparatus 20 via the communication network 30. For example, the communication IF 16 includes a communication modem or a network communication card which executes encoding and decoding of data transmitted/received via the communication network 30.

The control portion 11 has a communication function of executing a communication process with another communication apparatus such as the communication apparatus 20 via the communication IF 16 and the communication network 30. Specifically, the control portion 11 executes a communication process in accordance with a communication protocol called SIP (Session Initiation Protocol) defined in RFC 3261. More specifically, the control portion 11 has an IP-FAX function of executing a FAX transmission process and a FAX reception process. It should be noted that in the present embodiment, the IP-FAX function will be described as an example, but the present disclosure is applicable to a communication apparatus that executes various communication processes such as IP phone, video phone, video conferencing, video chat, and instant messenger.

Meanwhile, the communication apparatus 20 is configured similarly to the communication apparatus 10 and is a multi-function peripheral which has an IP-FAX function, a copy function, a print function, a scan function, and the like. Specifically, as shown in FIG. 1, the communication apparatus 20 includes a control portion 21, a storage portion 22, an operation display portion 23, an image reading portion 24, an image forming portion 25, a communication IF 26, and the like, and these constituent elements are connected to each other via an internal bus 27. The control portion 21 includes a CPU 211, a ROM 212, a RAM 213, and an EEPROM 214. In addition, the storage portion 22 includes a data storage portion 221, a prohibition information storage portion 222, and a reception information storage portion 223. In the communication apparatus 10 and the communication apparatus 20, the constituent elements whose reference signs are different from each other but whose names are the same are similarly configured. Therefore, the description of each constituent element of the communication apparatus 20 is omitted here.

It should be noted that an SIP server which administers SIP addresses may be connected to the communication network 30. The SIP server relays a communication process between the communication apparatus 10 and the communication apparatus 20 which communication process is performed in accordance with the SIP. The present disclosure is also applicable to a configuration in which a communication process is executed via the SIP server. In addition, the SIP server may be understood as a communication apparatus according to the present disclosure. Hereinafter, in the present embodiment, as an example, the case will be described in which the communication apparatus 10 is a transmission-side communication apparatus, the communication apparatus 20 is a reception-side communication apparatus, and a direct communication process therebetween is executed.

Figure 2:
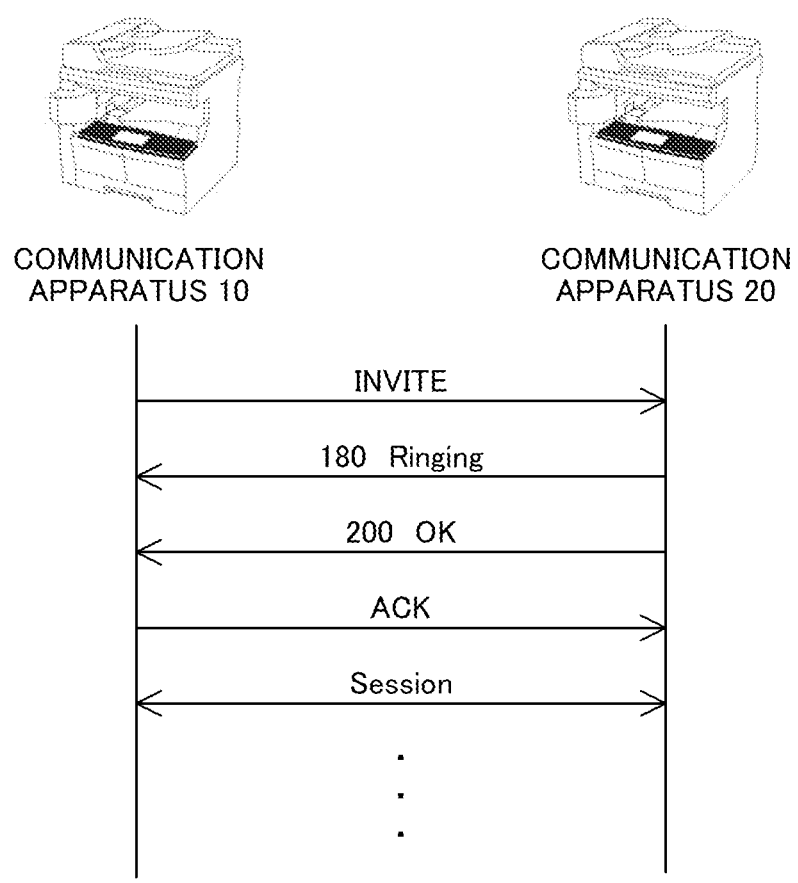
FIG. 2 is a diagram for explaining an example of success of a FAX transmission process executed by communication apparatuses according to the embodiment of the present disclosure.

Here, an example of success of a FAX transmission process executed from the communication apparatus 10 with the communication apparatus 20 as a destination will be described with reference to FIG. 2. As shown in FIG. 2, the FAX transmission process is executed between the communication apparatus 10 and the communication apparatus 20 by the control portion 11 and the control portion 21 transmitting/receiving various messages specified in SIP. First, the communication apparatus 10 notifies the communication apparatus 20 of "INVITE" for requesting session start of the FAX transmission process. Meanwhile, the communication apparatus 20 notifies the communication apparatus 10 of "180 Ringing" indicating that ringing from the communication apparatus 10 has been started. Subsequently, since the communication apparatus 20 is in a FAX receivable state, the communication apparatus 20 notifies the communication apparatus 10 of "200 OK". Then, the communication apparatus 10 notifies the communication apparatus 20 of "ACK". Through the above procedure, a session is established between the communication apparatus 10 and the communication apparatus 20, and the FAX transmission process from the communication apparatus 10 to the communication apparatus 20 is started. In the FAX transmission process, image data read by the image reading portion 14 or image data stored in the data storage portion 121 is transmitted to the communication apparatus 20 via the communication IF 16 and the communication network 30. It should be noted that this session is cut off after end of the FAX transmission process.

Next, an example of failure of the FAX transmission process executed from the communication apparatus 10 with the communication apparatus 20 as a destination will be described with reference to FIG. 3. In the case where an error such as memory fullness (over-capacity), a paper out state, or paper jam has occurred in the communication apparatus 20, the communication apparatus 20 comes into a non-executable state in which the communication apparatus 20 cannot execute a FAX reception process. It should be noted that the memory fullness is, for example, an error that occurs when the data amount of image data stored in the data storage portion 221 as a result of FAX reception reaches the storage capacity of the data storage portion 221 in a nighttime output prohibition state in which printout is prohibited during a preset nighttime period (e.g., 12 hours from 8 p.m. to 8 a.m.). When the communication apparatus 20 is in the non-executable state, the FAX transmission process requested from the communication apparatus 10 to the communication apparatus 20 fails.

Figure 3:
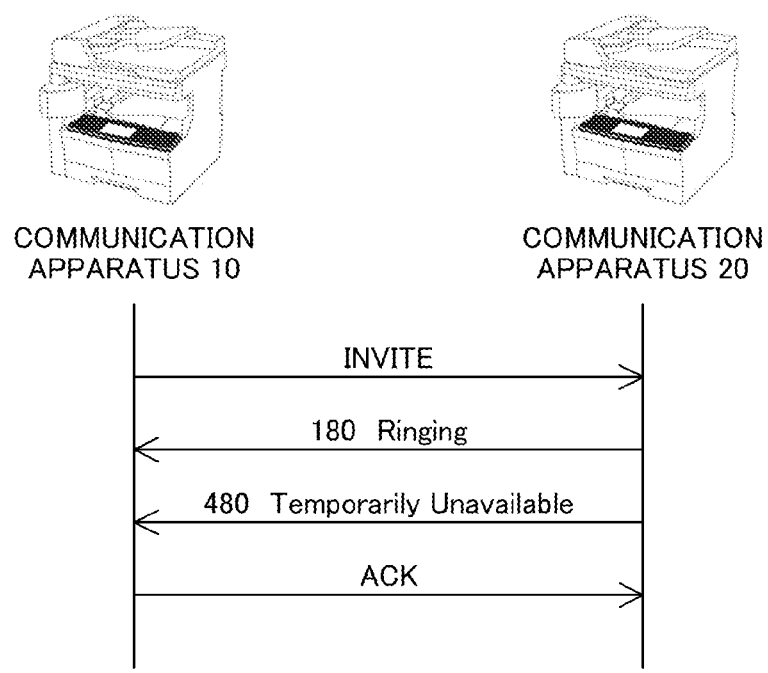
FIG. 3 is a diagram for explaining an example of failure of the FAX transmission process executed by the communication apparatuses according to the embodiment of the present disclosure.

As shown in FIG. 3, first, the communication apparatus 10 notifies the communication apparatus 20 of "INVITE". Then, the communication apparatus 20 notifies the communication apparatus 10 of "180 Ringing". However, when the communication apparatus 20 is in a non-receivable state, the communication apparatus 20 cannot execute a FAX reception process. In this case, the communication apparatus 20 notifies the communication apparatus 10 of "480 Temporarily Unavailable" indicating a response that incoming call is not acceptable. Then, the communication apparatus 20 notifies the communication apparatus 20 of "ACK". In this case, a session is not established between the communication apparatus 10 and the communication apparatus 20, and the FAX transmission process from the communication apparatus 10 to the communication apparatus 20 fails.

Here, "480 Temporarily Unavailable" notified from the communication apparatus 20 to the communication apparatus 10 when the communication process requested from the communication apparatus 10 is non-executable by the communication apparatus 20 includes a Retry-After header field. A value (hereinafter, referred to as "retry time period") indicating a standby time period until retry of the communication process that has failed is described in the Retry-After header field. It should be noted that the retry time period is a value that is appropriately set in the reception-side communication apparatus in accordance with a self-state or the like.

For example, it is conceivable that in the communication apparatus 20, the retry time period is set, in accordance with a situation, as 3600 [s] when the communication apparatus 20 is in a memory full state and as 300 [s] when the communication apparatus 20 is in a busy state. As a matter of course, it is also conceivable that in the communication apparatus 20, the retry time period is previously set at a fixed time. In addition, it is also conceivable that in the case where the SIP server is configured to relay a communication process and the reception-side communication apparatus is in the non-executable state, the SIP server notifies the transmission-side communication apparatus of a preset fixed value (e.g., 180 [s]) as the retry time period.

It should be noted that, other than SIP, the communication apparatus 10 and the communication apparatus 20 may execute a communication process in accordance with another communication protocol defined such that the reception-side communication apparatus notifies transmission-side communication apparatus of a retry time period when the communication process requested from the transmission-side communication apparatus is non-executable by the reception-side communication apparatus.

Here, it is also conceivable that even when the communication apparatus 20 shifts from the non-executable state to an executable state before the retry time period elapses, the communication apparatus 10 does not execute the communication process until the retry time period elapses. For example, it is conceivable that after memory fullness occurs as a result of FAX reception in the nighttime output prohibition state in which printout is prohibited during a preset nighttime period, a remaining time until end of the nighttime period is notified of as a retry time period from the communication apparatus 20 to the communication apparatus 10. In this case, when the nighttime output prohibition state is cancelled manually by the user and printout is executed before the end of the nighttime period, the memory fullness is cancelled. Thus, thereafter, it is made possible to execute FAX reception even before the end of the nighttime period.

On the other hand, when the non-executable state of the communication apparatus 20 is cancelled before elapse of the retry time period, it is possible to execute a FAX transmission process from the communication apparatus 10 to the communication apparatus 20 at that time point. Thus, in the communication system 1, later-described various control processes are executed by the communication apparatus 10 and the communication apparatus 20. By so doing, in the communication system 1, a useless communication process from the communication apparatus 10 with the communication apparatus 20 in the non-executable state as a destination is suppressed, and a communication process from the communication apparatus 10 to the communication apparatus 20 is immediately started when the non-executable state is cancelled. It should be noted that in the present embodiment, for convenience of explanation, as an example, the case will be described in which the communication apparatus 10 is a transmission-side communication apparatus and the communication apparatus 20 is a reception-side communication apparatus, but the present disclosure is not limited to this. In other words, the control portion 11 and the control portion 21 of the communication apparatus 10 and the communication apparatus 20 are able to execute the same processes, the communication apparatus 10 can be a reception-side communication apparatus, and the communication apparatus 20 can be a transmission-side communication apparatus.

Figure 6:
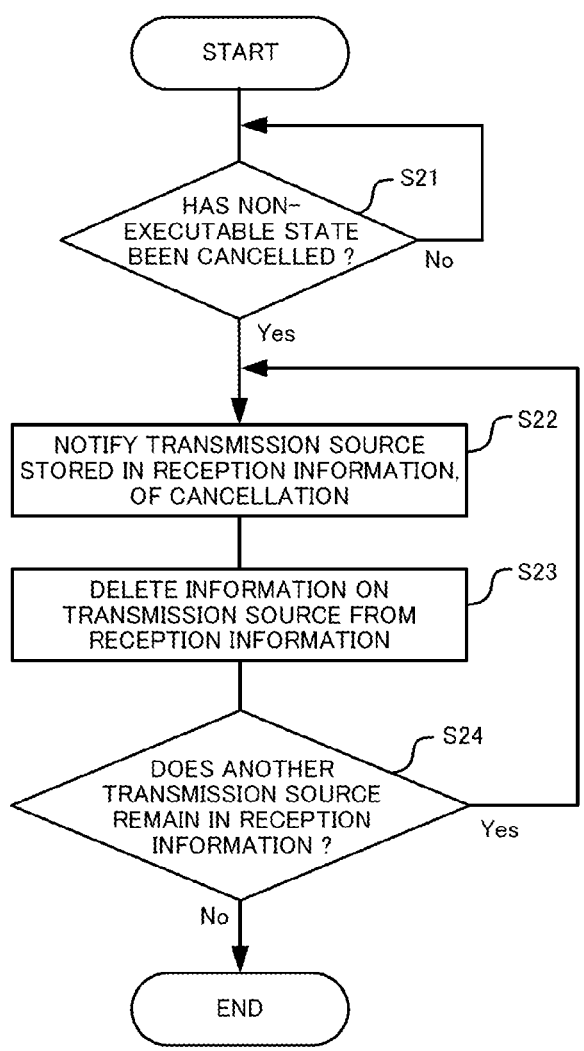
FIG. 6 is a flowchart showing an example of the procedure of a notification control process executed by the communication apparatus according to the embodiment of the present disclosure.
Figure 7:
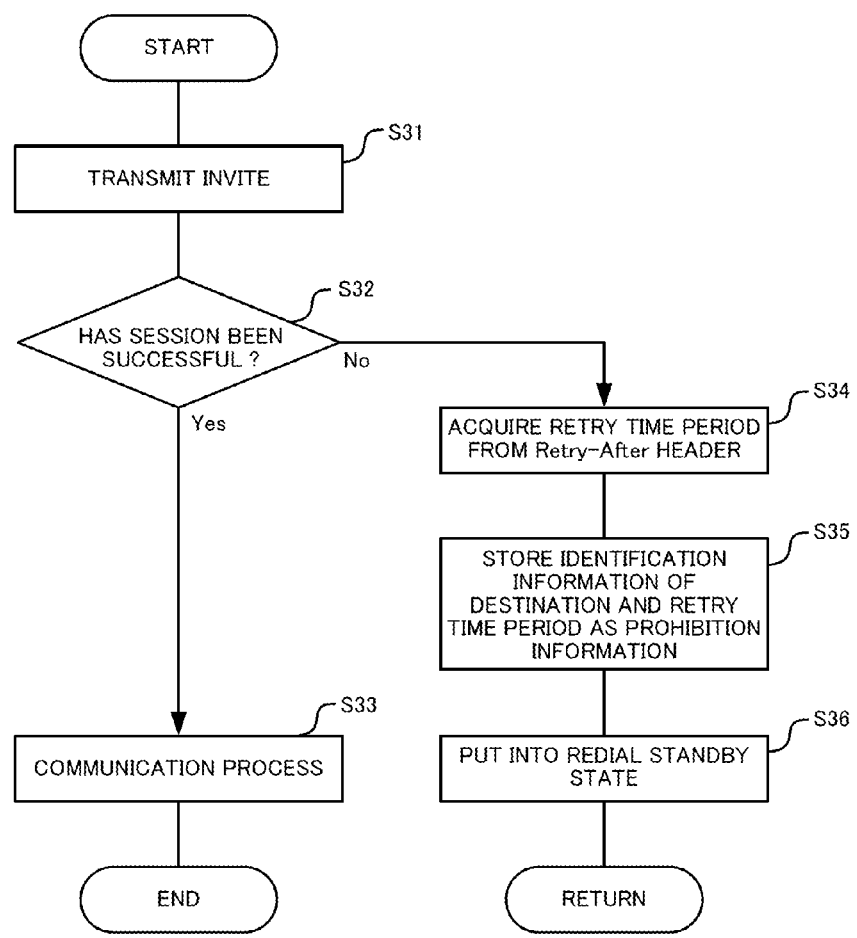
FIG. 7 is a flowchart showing an example of the procedure of a transmission control process executed by the communication apparatus according to the embodiment of the present disclosure.

Hereinafter, an example of the procedure of a reception control process and a notification control process executed by the control portion 21 of the communication apparatus 20 in accordance with the control program will be described with reference to FIGS. 4 to 6. It should be noted that respective process steps executed by the control portion 21 are referred to as steps S11, S12, . . . , and steps S21, S22, . . . .

[Reception Control Process]

<Step S11>

First, in step S11, the control portion 21 determines presence/absence of reception of an INVITE message from an external apparatus such as the communication apparatus 10. Here, if the control portion 21 determines that the INVITE message has been received (Yes in S11), the control portion 21 advances the processing to step S12. Before the INVITE message is received (No in S11), the control portion 21 repeats the process in step S11.

<Step S12>

In step S12, the control portion 21 determines whether the communication apparatus 20 is in a state in which the communication apparatus 20 can execute a communication process requested by the INVITE message. For example, in the case where the communication process is FAX transmission process, when an error such as memory fullness, a paper out state, or paper jam has occurred, the control portion 21 determines that the communication apparatus 20 is in a non-executable state. Here, if the control portion 21 determines that the communication apparatus 20 is in an executable state (Yes in S12), the control portion 21 advances the processing to step S13. On the other hand, if the control portion 21 determines that the communication apparatus 20 is in a non-executable state (No in S12), the control portion 21 advances the processing to step S14.

<Step S13>

In step S13, the control portion 21 establishes communication with the communication apparatus 10 and executes communication process. For example, in the case where the communication process is FAX transmission process, the control portion 21 executes FAX reception process of receiving image data and the like transmitted from the communication apparatus 10. Thereafter, the control portion 21 returns the processing to step S11.

<Step S14>

Meanwhile, in step S14, the control portion 21 determines whether the communication apparatus 10 which is the transmission source of the INVITE message has a cancellation response function. The cancellation response function is a function of retrying a communication process with respect to a communication apparatus when a notice of cancellation of the non-executable state is received from the communication apparatus that is the destination of the communication process as described later. The control portion 21 is able to determine presence/absence of the cancellation response function, for example, on the basis of information on the communication apparatus 10 which is described in the INVITE message transmitted from the communication apparatus 10.

The information on the communication apparatus 10 is, for example, the SIP address, the IP address, the MAC address, the URL, the mail address, the terminal identification name, the registered name in an address book, the phone number, the abbreviated dialing number, or the model information of the communication apparatus 10, the version information of SIP, communication protocol information, or the like. In addition, it is also conceivable that the control portion 21 has a function of previously performing registration as a communication apparatus having the cancellation response function, and determines whether the communication apparatus 10 has the cancellation response function, on the basis of the registration information.

Here, if the control portion 21 determines that the communication apparatus 10 has the cancellation response function (Yes in S14), the control portion 21 advances the processing to step S15. On the other hand, if the control portion 21 determines that the communication apparatus 10 does not have the cancellation response function (No in S14), the control portion 21 advances the processing to step S141. It should be noted that it is conceivable that if it is unknown whether the communication apparatus 10 has the cancellation response function, the control portion 21 advances the processing to step S15.

<Step S141>

In step S141, the control portion 21 sets the retry time period in accordance with a current situation of the communication apparatus 20. For example, as described above, the retry time period is set, in accordance with a situation as 3600 [s] when the communication apparatus 20 is in a memory full state and as 300 [s] when the communication apparatus 20 is in a busy state. In addition, when memory fullness has occurred as a result of FAX reception in the nighttime output prohibition state in which printout is prohibited during a preset nighttime period, a remaining time until end of the nighttime period is set as a retry time period. Thereafter, the control portion 21 advances the processing to step S18.

<Step S15>

Meanwhile, if the communication apparatus 10 has the cancellation response function, the control portion 21 sets the retry time period as a preset indefinite period in the next step S15. For example, in the case where the retry time period is represented by a four-digit hexadecimal number and "FFFF" is defined as information representing an indefinite period, the control portion 21 sets the retry time period as "FFFF". It should be noted that the retry time period in step S15 is not limited to the indefinite period if it is longer than the retry time period that is set in step S141.

<Step S16>

Next, in step S16, the control portion 21 stores identification information of the communication apparatus 10, which is the transmission source of the INVITE message (the request source of the communication process), as the reception information D1 into the reception information storage portion 223 of the storage portion 22. Here, the control portion 21 when executing the above storage process is an example of a first storage control portion. The reception information D1 includes information such as the FAX number of the communication apparatus 10, which is the transmission source of the INVITE message, and the time and date when the INVITE message is received, as shown in FIG. 5. It should be noted that the FAX number in the reception information D1 is merely an example of identification information with which the communication apparatus 10, which is the transmission source of the INVITE message, is identifiable. For example, the identification information may be the SIP address, the IP address, the MAC address, the URL, the mail address, the terminal identification name, the registered name in an address book, the phone number, the abbreviated dialing number, or like of the communication apparatus 10.

<Step S17>

In step S17, the control portion 21 starts the later-described notification control process (see FIG. 6) in order to notify the communication apparatus 10, which is the transmission source of the INVITE message, of cancellation of the non-executable state when the non-executable state is cancelled. The notification control process is executed by the control portion 21 in parallel with the reception control process.

<Step S18>

In step S18, the control portion 21 notifies the communication apparatus 10, which is the transmission source of the INVITE message, of "480 Temporarily Unavailable". At that time, "480 Temporarily Unavailable" includes the retry time period that is set in step S15 or step S141. The control portion 21 when notifying the communication apparatus 10 of the retry time period if the communication process requested from the communication apparatus 10 which is the transmission-side communication apparatus is non-executable as described above (No in S12) is an example of a retry notification portion. Thereafter, the control portion 21 returns the processing to step S11.

Thus, if the communication apparatus 10, which is the transmission source, does not have the cancellation response function, retry of the communication process is executed on the basis of the retry time period that is set in step S141. On the other hand, if the communication apparatus 10, which is the transmission source, has the cancellation response function, retry of the communication process is executed when cancellation of the non-executable state is notified through the later-described notification control process.

[Notification Control Process]

Next, an example of the procedure of the notification control process started in step S17 will be described with reference to FIG. 6.

<Step S21>

In step S21, the control portion 21 determines whether the non-executable state of the communication apparatus 20 has been cancelled. In other words, the control portion 21 determines whether the communication process that is determined in step S12 as being non-executable has been in an executable state. Here, the control portion 21 repeatedly executes the process in step S21 until the non-executable state is cancelled (No in S21). On the other hand, if the non-executable state has been cancelled (Yes in S21), the control portion 21 advances the processing to step S22.

For example, if the FAX reception process has been non-executable due to occurrence of memory fullness, the control portion 21 determines that the non-executable state is cancelled, when image data in the data storage portion 221 is printed out and a free area is provided in the data storage portion 221. In addition, if paper jam has occurred, the control portion 21 determines that the non-executable state is cancelled, when the paper jam in the image forming portion 25 is cancelled. Similarly, if a paper out state has occurred, the control portion 21 determines that the non-executable state is cancelled, when paper sheets are supplied into a sheet feed cassette of the image forming portion 25.

<Step S22>

If the non-executable state of the communication process has been cancelled, in step S22, the control portion 21 transmits a cancellation notice indicating that the non-executable state has been cancelled, to the communication apparatus 10 corresponding to the identification information of the transmission source included in the reception information D1 stored in the prohibition information storage portion 222. The control portion 21 when executing the process in step S22 as described above is an example of a cancellation notification portion.

Specifically, in step S22, the control portion 21 adds cancellation information indicating that the non-executable state has been cancelled, to an INVITE message in SIP, and transmits the INVITE message to the communication apparatus 10 which is the transmission source included in the reception information D1. It is conceivable that the cancellation information is added to tag information described in a From header of the INVITE message. It is conceivable that, for example, in the case where the From header is "From:User<sip:User1@send.example.org>;tag=98765", the From header to which "XXX" is added as the cancellation information is "From:User<sip:User1@send.example.org>;tag=98765-XXX". In this case, in the communication apparatus 10 having the cancellation response function, the control portion 11 is configured to recognize that the non-executable state of the communication apparatus 20 which is the transmission source of the INVITE message to which "XXX" has been added as the cancellation information has been cancelled, if "XXX" has been added to the From header. It should be noted that a header area to which the cancellation information is added is not limited to the From header and is conceivable as any header area, but is desirably an essential header area in the INVITE message specified in SIP. Examples of the essential header area include, in addition to the From header, a Via header, a Max-Forwards header, a To header, a Call-ID header, and a CSeq header. As a matter of course, the cancellation information may be described in a body portion described in the INVITE message.

In addition, it is also conceivable that an existing header such as the From header of the INVITE message is not used and an original header for describing the cancellation information is newly added to the INVITE message. In this case, in the communication apparatus 10 having the cancellation response function, the control portion 11 is configured to recognize that the non-executable state of the communication apparatus 20 which is the transmission source of the INVITE message to which the original header has been added as the cancellation information has been cancelled, if the original header is included in the INVITE message. For example, the original header is "XXX:OK".

<Step S23>

Then, in step S23, the control portion 21 deletes information on the communication apparatus 10, which is the transmission source notified of the cancellation of the non-executable state in step S22, of the information on the transmission sources stored as the reception information D1 in the reception information storage portion 223.

<Step S24>

In step S24, the control portion 21 determines whether information on another transmission source remains in the reception information D1. Here, if the control portion 21 determines that information on another transmission source remains in the reception information D1 (Yes in S24), the control portion 21 advances the processing to step S22 and transmits the cancellation notice to the transmission source stored in the reception information D1. By so doing, the cancellation notice is transmitted to each transmission source stored in the reception information D1. Thereafter, if the control portion 21 determines that no information on a transmission source remains in the reception information D1 (No in S24), the control portion 21 ends the notification control process.

As an example, the case has been described where, in the reception control process and the notification control process, only the information on the communication apparatus 10 having the cancellation response function is stored in the reception information D1 and the cancellation notice is transmitted to the transmission source stored in the reception information D1. Meanwhile, a configuration is also conceivable in which, in step S16, the identification information of the communication apparatus 10, which is the transmission source, and information indicating whether the communication apparatus 10 has the cancellation response function are stored in the reception information D1 regardless of whether the communication apparatus 10 has the cancellation response function. In this case, when the non-executable state has been cancelled, the control portion 21 transmits a notice of cancellation of the non-executable state to the communication apparatus 10 having the cancellation response function, of the information stored in the reception information D1.

[Transmission Control Process]

Next, an example of the procedure of a transmission control process, a retry control process, and a communication inhibition process executed by the control portion 11 of the communication apparatus 10 in accordance with the control program will be described with reference to FIGS. 7 to 10. It should be noted that respective process steps executed by the control portion 11 are referred to as steps S31, S32, . . . , steps S41, S42, . . . , and steps S51, S52, . . . .

<Step S31>

First, in step S31, the control portion 11 transmits an INVITE message as a request signal for starting a communication process (a FAX transmission process, etc.) with the communication apparatus 20 which is a destination that is preset by an operation input to the operation display portion 13 by the user.

<Step S32>

In step S32, the control portion 11 determines whether a session with the communication apparatus 20 has been successful with the INVITE message transmitted in step S31. Specifically, if "200 OK" is notified of (see FIG. 2), the control portion 11 determines that the session has been successful, and if "480 Temporarily Unavailable" is notified of (see FIG. 3), the control portion 11 determines that the session has failed. If the session has been successful (Yes in S32), the control portion 11 advances the processing to step S33. If the session has failed (No in S32), the control portion 11 advances the processing to step S34.

<Step S33>

In step S33, the control portion 11 executes the communication process requested by the INVITE message, with the communication apparatus 20. Specifically, in the case where the communication process is a FAX transmission process, the control portion 11 transmits image data or the like to the communication apparatus 20. It should be noted that after end of the communication process, the control portion 11 cuts off the session and ends the transmission control process.

<Step S34>

In step S34, the control portion 11 acquires the value of the retry time period described in the Retry-After header field of "480 Temporarily Unavailable" received from the communication apparatus 20. For example, if the retry time period described in the Retry-After header field is "FFFF", the control portion 11 recognizes that the retry time period is set as the indefinite period. It should be noted that it is also conceivable that if the value of the retry time period is not described in the Retry-After header field, the control portion 11 sets the retry time period as a preset fixed time period or indefinite period.

<Step S35>

Next, in step S35, the control portion 11 stores, into the prohibition information storage portion 222 of the storage portion 22, prohibition information D2 that associates the retry time period with identification information of the communication apparatus 20, which is the destination of the communication process (the destination of the INVITE message). The control portion 11 when executing the storage process as described above is an example of a second storage control portion. The prohibition information D2 includes information such as the FAX number of the communication apparatus 20, which is the transmission source of the retry time period, and the retry time period, as shown in FIG. 8. It should be noted that the FAX number in the prohibition information D2 is merely an example of identification information with which the communication apparatus 20, which is the transmission source of the retry time period, is identifiable, and may be the SIP address, the IP address, the MAC address, the URL, the mail address, the terminal identification name, the registered name in an address book, the phone number, the abbreviated dialing number, or like of the communication apparatus 20. It is conceivable that at that time, the control portion 11 acquires the identification information of the communication apparatus 20, which is the transmission source of the retry time period, from the header included in "480 Temporarily Unavailable". In addition, it is also conceivable that the control portion 11 stores information on the destination of "INVITE" transmitted in step S31, as identification information of the communication apparatus 20 which is the transmission source of the retry time period.

<Step S36>

Thereafter, in step S36, the control portion 11 makes the communication process requested in step S31, into a redial standby state. Then, the timing of retry of the communication process with, as a destination, the communication apparatus 20 corresponding to the destination included in the prohibition information D2 which communication process is caused to be in the redial standby state is controlled by the later-described retry control process. In other words, if the retry time period is received when start of the communication process is requested (No in S32), the control portion 11 temporarily prohibits retry of the communication process. The control portion 11 when executing the prohibition process as described above is an example of a communication prohibition portion.

[Retry Control Process]

Figure 9:
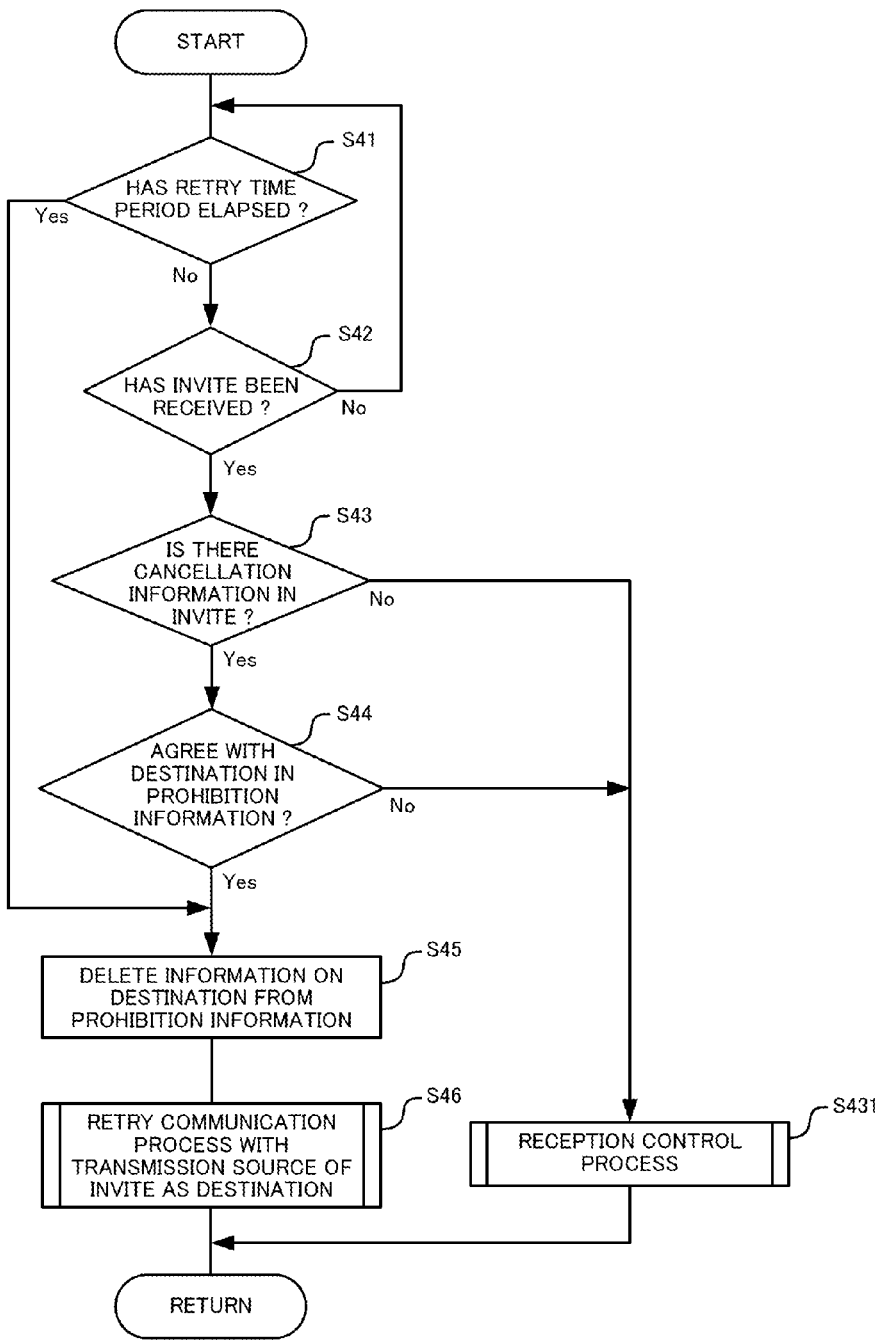
FIG. 9 is a flowchart showing an example of the procedure of a retry control process executed by the communication apparatus according to the embodiment of the present disclosure.

Next, an example of the procedure of the retry control process executed by the control portion 11 will be described with reference to FIG. 9.

<Step S41>

First, in step S41, the control portion 11 determines whether any one of the retry time periods stored in the prohibition information D2 has elapsed. Here, if the control portion 11 determines that any of the retry time periods has elapsed (Yes in S41), the control portion 11 advances the processing to step S45. On the other hand, if no retry time period has elapsed (No in S41), the control portion 11 advances the processing to step S42.

<Step S42>

In step S42, the control portion 11 determines whether an INVITE message has been received from an external apparatus such as the communication apparatus 20 via the communication network 30. Here, if the control portion 11 determines that the INVITE message has been received (Yes in S42), the control portion 11 advances the processing to step S43. On the other hand, if the INVITE message has not been received (No in S42), the control portion 11 returns the processing to step S41.

<Step S43>

In step S43, the control portion 11 determines whether the cancellation information has been added to the INVITE message in SIP transmitted from the communication apparatus 20. Here, if the control portion 11 determines that the cancellation information has been added to the INVITE message (Yes in S43), the control portion 11 determines that cancellation of the non-executable state has been notified of by the communication apparatus 20, and advances the processing to step S44. On the other hand, if the cancellation information has not been added to the INVITE message (No in S43), the control portion 11 advances the processing to step S431. For example, in the example described above, if "XXX" has been added as the cancellation information to the From header of the INVITE message, the control portion 11 determines that cancellation of the non-executable state has been notified of.

<Step S431>

Figure 4:
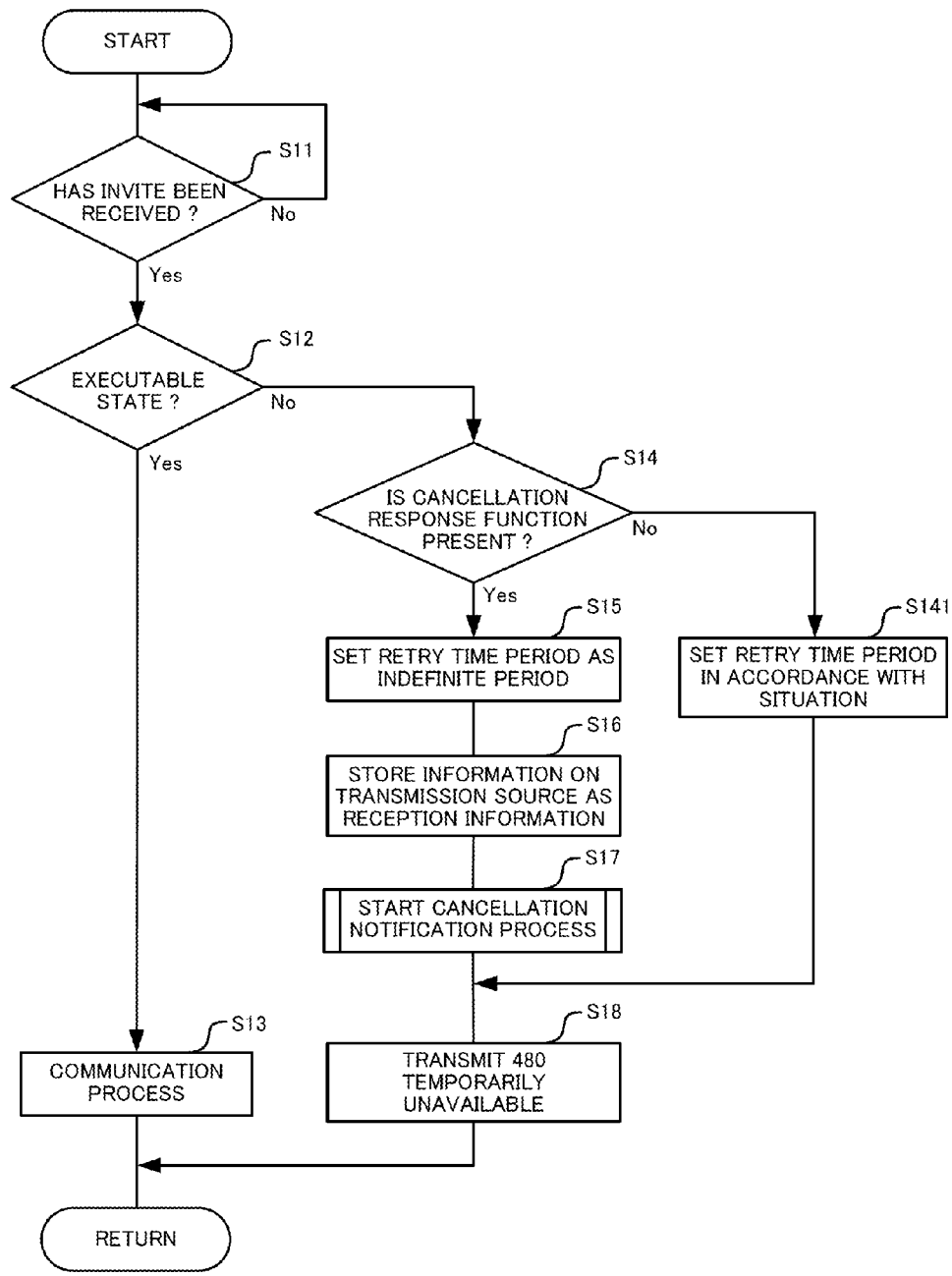
FIG. 4 is a flowchart showing an example of the procedure of a reception control process executed by the communication apparatus according to the embodiment of the present disclosure.

In step S431, the control portion 11 determines that the INVITE message is a signal that requests start of a communication process, and executes the reception control process on the basis of the INVITE message (see FIG. 4). For example, if the INVITE message is a request for executing a FAX transmission process, the control portion 11 executes the FAX transmission process in accordance with the reception control process (see FIG. 4).

<Step S44>

Meanwhile, in step S44, the control portion 11 determines whether the communication apparatus 20, which is the transmission source of the INVITE message to which the cancellation information has been added, agrees with any destination included in the prohibition information D2 stored in the prohibition information storage portion 122. It should be noted that, for example, the control portion 11 acquires the identification information of the communication apparatus 20 from the INVITE message. Here, if the control portion 11 determines that the communication apparatus 20 agrees with any destination stored in the prohibition information D2 (Yes in S44), the control portion 11 advances the processing to step S45. On the other hand, if the control portion 11 determines that the communication apparatus 20 does not agree with any destination stored in the prohibition information D2 (No in S44), the control portion 11 advances the processing to step S431.

<Step S45>

In step S45, the control portion 11 deletes the information on the communication apparatus 20 from the destination in the prohibition information D2 stored in the prohibition information storage portion 122. By so doing, the communication apparatus 20 is excluded from communication apparatuses with which a communication process is prohibited in the later-described communication inhibition process, and thus prohibition of the communication process with the communication apparatus 20 as a destination is cancelled.

Specifically, in the retry control process, if the control portion 11 determines in step S41 that any of the retry time periods has elapsed (Yes in S41), prohibition of a communication process with a destination corresponding to the retry time period is cancelled. The control portion 21 when executing such a process as described above is an example of a first prohibition cancellation portion.

Furthermore, in the retry control process, also if the control portion 21 determines in steps S42 to S44 that a notice of cancellation of the non-executable state has been received from the communication apparatus 20 included as a destination in the prohibition information D2 (Yes in in S42 to S44), prohibition of a communication process with this destination is cancelled. The control portion 21 when executing such a process is an example of a second prohibition cancellation portion. In other words, in the retry control process, if either one of conditions of elapse of the retry time period and notification of cancellation of the non-executable state is met, prohibition of a communication process with the communication apparatus 20 stored in the prohibition information D2 is cancelled.

<Step S46>

Then, in step S46, the control portion 11 retries the communication process which is made into the redial standby state by step S36. More specifically, the control portion 11 transmits an INVITE message that requests the communication process which has been in the redial standby state, to the communication apparatus 20 by executing the transmission control process (see FIG. 5) after reception of the INVITE message from the communication apparatus 20. At that time, since the non-executable state of the communication apparatus 20 has been cancelled, the communication process from the communication apparatus 10 with the communication apparatus 20 as a destination is normally performed.

Meanwhile, it is also conceivable that the retry of the communication process executed by the control portion 11 in step S46 is executed in a session established by the INVITE message from the communication apparatus 20. For example, the control portion 21 of the communication apparatus 20 has a so-called polling reception function and transmits a notice of cancellation of the non-executable state together with an INVITE message that requests polling reception. Meanwhile, in the communication apparatus 10, the control portion 11 establishes a communication process with the communication apparatus 20 in accordance with the INVITE message from the communication apparatus 20, and transmits image data that is a transmission object of the FAX transmission process that has been in the redial standby state, to the communication apparatus 20. By so doing, the communication apparatus 20 can receive the image data transmitted from the communication apparatus 10.

As described above, in the communication apparatus 10, when the non-executable state of the communication apparatus 20 is cancelled, even if the retry time period has not elapsed, a communication process that fails when the communication apparatus 20 is in the non-executable state is executed again. Therefore, in the communication system 1, a useless communication process from the communication apparatus 10 with the communication apparatus 20 in the non-executable state as a destination is suppressed, and a communication process is immediately restarted when the non-executable state of the communication apparatus 20 is cancelled. In particular, even if it is unknown whether the communication apparatus 10, which is the transmission source, has the cancellation response function, retry of the communication process is executed at an earlier time of the time of elapse of the retry time period or the time of notification of cancellation of the non-executable state, and thus the communication apparatus 10 is excellent in versatility.

Meanwhile, as another embodiment, it is conceivable that the retry of the communication process in step S46 is executed if both the cancellation condition of elapse of the retry time period and the cancellation condition of reception of the notice of cancellation of the non-executable state are met. Specifically, it is conceivable that at the time when the retry time period elapses, or at the time when the notice of cancellation of the non-executable state is received, the control portion 11 performs only cancellation of prohibition of the communication process and does not execute the retry of the communication process in step S46. It is conceivable that then, at the time when the notice of cancellation of the non-executable state is received after elapse of the retry time period, or at the time when the retry time period elapses after reception of the notice of cancellation of the non-executable state, the control portion 11 executes the retry of the communication process in step S46. In other words, if both the cancellation condition in step S41 and the cancellation condition in steps S42 to S44 are met, the control portion 11 retries the communication process. In such a configuration, at the time when the notice of cancellation of the non-executable state is received, retry of the communication process is not executed. Thus, for example, even when a lot of the communication processes are in a standby state, the respective communication processes are separately executed at the times when the retry time periods elapse. Thus, it is possible to avoid a situation where the respective communication processes are continuously retried so that the user cannot use the communication apparatus 10 for a while. In addition, even when the retry time period has elapsed, the retry of the communication process is not executed until the notice of cancellation of the non-executable state is received. Thus, it is possible to prevent a useless communication process.

[Communication Inhibition Process]

Next, an example of the procedure of the communication inhibition process executed by the control portion 11 will be described with reference to FIG. 10. It should be noted that the transmission control process, the retry control process, and the communication inhibition process are executed in parallel by the control portion 11.

<Step S51>

First, in step S51, the control portion 11 waits for start of an input operation for a destination of a communication process (No in S51). Specifically, in the case where the communication process is a FAX transmission process, in step S51, the control portion 11 waits for start of an input operation for the FAX number of a destination of the FAX transmission process. For example, the user executes an input operation for the FAX number or the like of the destination by operating the operation display portion 13 to make a selection from an already registered address book, abbreviated dial numbers, or a communication history or to directly input characters or numbers. In addition, the user operates the operation display portion 13 to select transmission object data of the FAX transmission process from data stored in the data storage portion 121 of the communication apparatus 10 or the like. Then, the control portion 11 determines presence/absence of start of the input operation in accordance with whether an operation screen for executing the input operation has been opened. Then, if the control portion 11 determines that the input operation for the destination has been started (Yes in S51), the control portion 11 advances the processing to step S52.

<Steps S52 and S53>

In step S52, the control portion 11 determines whether the inputted destination agrees with any destination included in the prohibition information D2 (see FIG. 8). Here, if the control portion 11 determines that the inputted destination does not agree with any destination (No in S52), the control portion 11 advances the processing to step S53 and starts the transmission control process (see FIG. 7). On the other hand, if the control portion 11 determines that the inputted destination agrees with any destination (Yes in S52), the control portion 11 advances the processing to step S54.

<Step S54>

In step S54, the control portion 11 prohibits an input operation for setting, as a destination, the communication apparatus 10 corresponding to the destination included in the prohibition information D2. Specifically, the control portion 11 executes a panel prohibition process of controlling the operation display portion 13 to prohibit an input operation for setting, as a destination, the communication apparatus 10 corresponding to the destination included in the prohibition information D2. The control portion 11 when executing the prohibition process in step S54 as described above is also an example of the communication prohibition portion. It should be noted that the control portion 11 may cause the operation display portion 13 to display the reason why an input of the destination is prohibited, or the like. For example, it is conceivable that the operation display portion 13 displays that an input operation for the destination is restricted since the retry time period has not elapsed after a communication process with the destination fails. It should be noted that as another embodiment, a configuration is also conceivable in which after a warning is provided through the above display, the control portion 11 is allowed to forcedly execute the communication process with the destination in accordance with a user operation.

Here, a specific example of a method of the prohibition operation in step S54 will be described. For example, it is conceivable that when a destination has been selected from the address book, the abbreviated dial numbers, or the communication history, the control portion 11 prohibits an operation of an enter key or a start key for determining a selection of the destination. More specifically, it is conceivable that in the case where the enter key or the start key is a touch key realized in the touch panel of the operation display portion 13, the operation display portion 13 grays out the touch key or causes the touch key to be not displayed. It should be noted that the same applies to the case where a destination is inputted directly (through character input or number input) to the operation display portion 13. In addition, it is conceivable that in the case where the enter key or the start key is a hardware key provided to the operation display portion 13, when the hardware key is pressed, the operation display portion 13 emits an error sound and invalidates the pressing operation.

Furthermore, it is also conceivable that in performing an input operation for a destination, when the control portion 11 causes the operation display portion 13 to display the address book, the abbreviated dial numbers, or the communication history stored in the communication apparatus 10, the control portion 11 grays out a display of any destination corresponding to the identification information stored in the prohibition information or causes such a destination to be not displayed, thereby prohibiting a selection of t such a destination. As a matter of course, it is also conceivable that the control portion 11 adds, to each destination stored in the prohibition information, a character, a sign, or a figure indicating a communication prohibition state, and displays each destination.

As described above, in the communication apparatus 10, with regard to a destination with which a communication process has failed once, until the retry time period notified from the destination at the time of the failure elapses, or until cancellation of the non-executable state is notified, a new communication process with the destination is prohibited. Therefore, in the communication apparatus 10, it is possible to prevent a useless communication process with a destination that is known to be in the non-executable state. For example, when a FAX transmission process with the communication apparatus 20 as a destination is requested from the communication apparatus 10, if the communication apparatus 20 is in the non-executable state, not only retry of the FAX transmission process but also another FAX transmission process newly requested from the communication apparatus 10 with the communication apparatus 20 as a destination are prohibited. On the other hand, a FAX transmission process requested from the communication apparatus 10 with a communication apparatus other than the communication apparatus 20 as a destination is not prohibited.

Meanwhile, even with a destination with which a FAX transmission process has failed, there is the possibility of success of a different type of a communication process such as IP phone or mail. Thus, it is conceivable that in step S5, a type of a communication process is stored so as to be associated with the prohibition information, and it is determined in step S52 at the same time whether the type of a communication process agrees with the stored type. Thus, it is possible to prevent only execution of a useless communication process whose type is the same as that of a communication process that has actually failed, and it is possible to prevent unnecessary restriction on other communication processes. For example, in the case where a plurality of pieces of information such as a FAX number, a phone number, and a mail address are stored for one destination, even when a FAX transmission process to the FAX number of the destination has failed, it is possible to execute a mail transmission process to the mail address of the destination.

[Another Example of Communication Inhibition Process]

Figure 10:
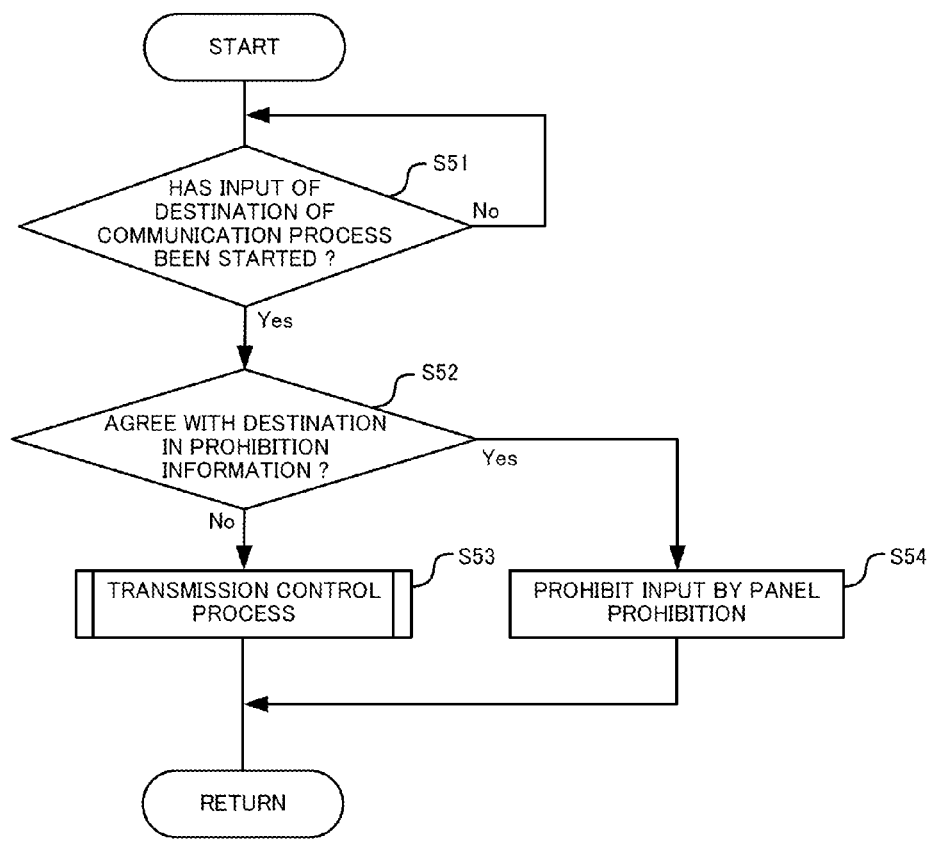
FIG. 10 is a flowchart showing an example of the procedure of a communication inhibition process executed by the communication apparatus according to the embodiment of the present disclosure.
Figure 11:
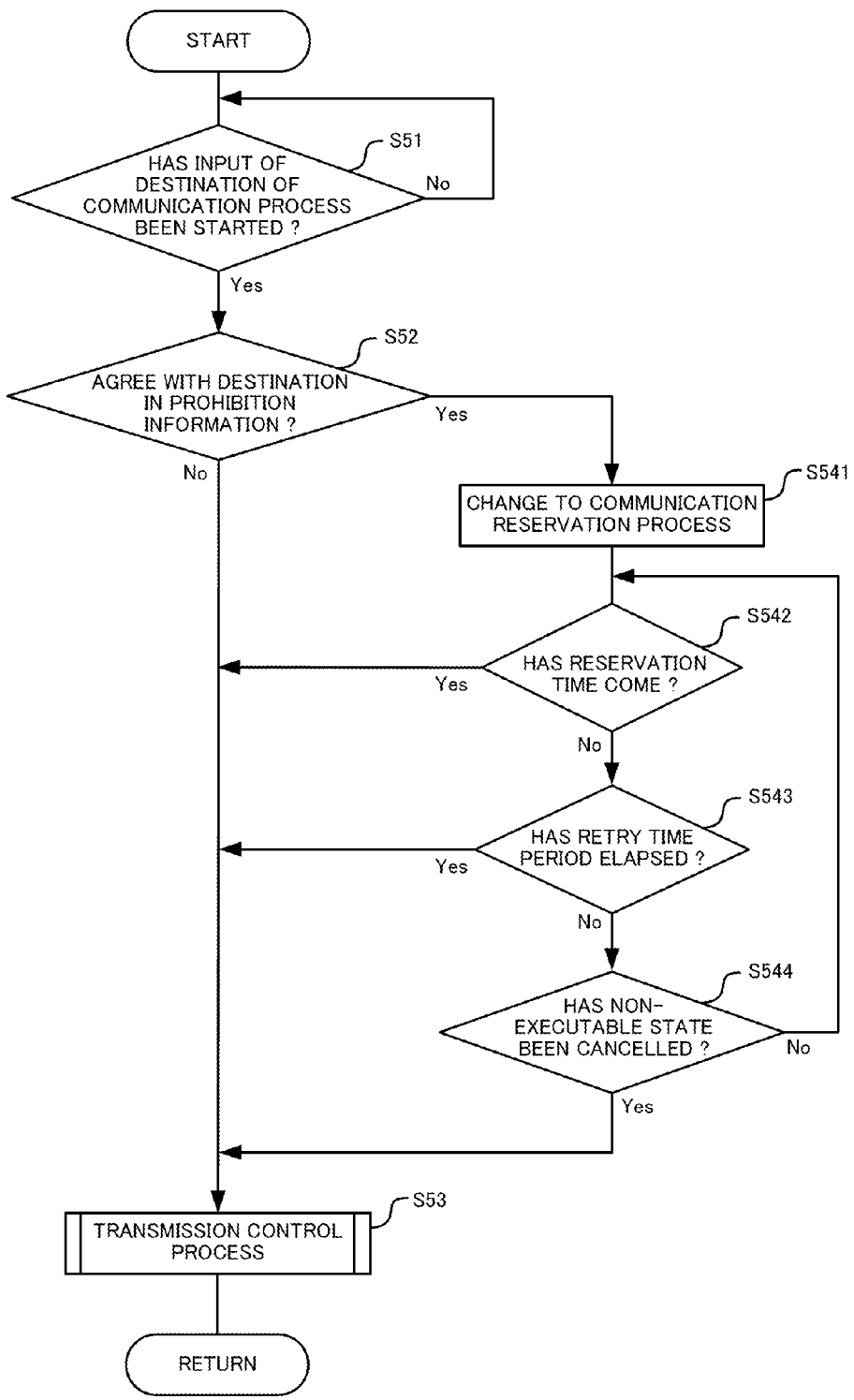
FIG. 11 is a flowchart showing an example of the procedure of the communication inhibition process executed by the communication apparatus according to the embodiment of the present disclosure.

FIG. 11 is a flowchart showing another example of the communication inhibition process (see FIG. 10). In the communication inhibition process shown in FIG. 11, steps S541 to S544 are executed instead of step S54. It should be noted that steps S51 to S53 are the same as described above and thus the description thereof is omitted.

<Step S541>

As shown in FIG. 11, if the control portion 11 determines in step S52 that the inputted destination agrees with any destination included in the prohibition information D2 (Yes in S52), the control portion 11 advances the processing to step S541. Then, in step S541, the control portion 11 changes to a communication reservation process of executing the communication process with the destination at a preset reservation time. The control portion 11 that temporarily prohibits execution of the communication process by executing step S541 as described above is also an example of the communication prohibition portion. At that time, the control portion 11 sets, as the reservation time, the time when the retry time period corresponding to the destination included in the prohibition information D2 elapses. In addition, it is conceivable that since the communication apparatus 10 has the cancellation response function, the control portion 11 sets the reservation time as unfixed. Thus, the communication process is immediately started at the time when the non-executable state of the communication apparatus 10 is cancelled, while a useless communication process is prevented. It should be noted that if, in step S541, the control portion 11 causes the operation display portion 13 to display that the communication process is to be reserved, the user is allowed to recognize that the communication process is to be reserved.

Thereafter, if any of preset conditions in steps S542 to S544 is met, the control portion 11 cancels prohibition of the communication process in step S541 and executes the communication process. The control portion 11 when executing steps S542 to S544 as described above is also an example of the second prohibition cancellation portion.

<Step S542>

Specifically, in step S542, the control portion 11 determines whether the reservation time that is set in step S541 has come. Here, if the control portion 11 determines that the reservation time has come (Yes in in S542), the control portion 11 advances the processing to step S53. If the reservation time has not come (No in S542), the control portion 11 advances the processing to step S543. It should be noted that also when the reservation time is unfixed, the control portion 11 advances the processing to step S543.

Therefore, at the time when the request of start of the communication process with the destination inputted in step S51 is received, the control portion 11 does not execute the communication process; and after the reservation time comes, the control portion 11 automatically executes the communication process. Thus, in the communication apparatus 10, it is possible to prevent a useless communication process with a destination that is known to be in the non-executable state, and it is possible to save user's time and effort to perform an operation for requesting the communication process again.

<Step S543>

In step S543, the control portion 11 determines whether the retry time period has elapsed in step S41 of the retry control process. Here, if the control portion 11 determines that the retry time period has elapsed (Yes in in S543), the control portion 11 advances the processing to step S53. If the retry time period has not elapsed (No in S543), the control portion 11 advances the processing to step S544.

Therefore, for example, even in the case where the reservation time is set such that the reservation time comes after elapse of the retry time period corresponding to the destination, the control portion 11 can retry the communication process at the time when the retry time period elapses.

<Step S544>

In step S544, the control portion 11 determines whether cancellation of the non-executable state has been notified of by the INVITE message. Here, if the control portion 11 determines that cancellation of the non-executable state has been notified of by the INVITE message (Yes in S544), the control portion 11 advances the processing to step S53. If cancellation of the non-executable state has not been notified of by the INVITE message (No in S544), the control portion 11 returns the processing to step S542.

Therefore, for example, even before the reservation time comes and the retry time period elapses, the control portion 11 can retry the communication process at the time when a notice of cancellation of the non-executable state is received.

In addition, it is also conceivable that in the communication apparatus 10, a process that is executed if the inputted destination agrees with any destination included in the prohibition information D2 is pre-settable. For example, in initial setting or the like of the communication apparatus 10, the control portion 11 selects either one of step S54 (see FIG. 10) or step S541 (see FIG. 11) in accordance with an operation input by the user to the operation display portion 13. Then, in the communication inhibition process, if the destination inputted to the operation display portion 13 is present in the prohibition information D2 (Yes in S52), the control portion 11 executes the previously selected process (S54 or S541). According to such a configuration, the user is allowed to optionally set a process that is executed if the inputted destination is present in the prohibition information, and thus the versatility of the communication apparatus 10 is increased.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication apparatus comprising:
a retry notification portion configured to notify a transmission-side communication apparatus of a retry time period indicating a standby time period until retry of a communication process requested from the transmission-side communication apparatus, when the communication process is non-executable;
a first storage control portion configured to store identification information of the transmission-side communication apparatus which is a request source of the communication process, into a first storage portion when the communication process is non-executable; and
a cancellation notification portion configured to notify the transmission-side communication apparatus corresponding to the identification information stored in the first storage portion, of cancellation of a non-executable state of the communication process when the non-executable state of the communication process is cancelled, wherein
the cancellation notification portion adds cancellation information indicating cancellation of the non-executable state, to a header area of an INVITE message in SIP (Session Initiation Protocol), and transmits the INVITE message, and
the first storage control portion stores reception information including the identification information of the transmission-side communication apparatus and information of time and date when the INVITE message in SIP transmitted from the transmission-side communication apparatus was received, into the first storage portion, and then when the cancellation information is transmitted by the cancellation notification portion, the first storage control portion deletes the reception information corresponding to the transmission-side communication apparatus that is a destination of the cancellation information, from the first storage portion.

2. The communication apparatus according to claim 1, wherein when the transmission-side communication apparatus has a function of retrying the communication process in accordance with notification of cancellation of the non-executable state, the retry notification portion provides a notice of an indefinite period as the retry time period.

3. The communication apparatus according to claim 1, further comprising:
a second storage control portion configured to store a retry time period and identification information of a reception-side communication apparatus which is a destination of a communication process, into a second storage portion such that the retry time period and the identification information are associated with each other when the retry time period is received from the reception-side communication apparatus;
a communication prohibition portion configured to prohibit a communication process with, as a destination, the reception-side communication apparatus corresponding to the identification information stored in the second storage portion;
a first prohibition cancellation portion configured to cancel prohibition of the communication process by the communication prohibition portion when the retry time period elapses; and
a second prohibition cancellation portion configured to cancel the prohibition of the communication process by the communication prohibition portion when cancellation of a non-executable state is notified of by the reception-side communication apparatus.

4. The communication apparatus according to claim 3, wherein the communication prohibition portion prohibits retry of the communication process when the retry time period is received.

5. The communication apparatus according to claim 4, wherein the first prohibition cancellation portion and the second prohibition cancellation portion retry the communication process retry of which is prohibited by the communication prohibition portion.

6. The communication apparatus according to claim 3, wherein the communication prohibition portion prohibits an input operation for setting the reception-side communication apparatus as a destination of a communication process.

7. The communication apparatus according to claim 3, wherein the communication prohibition portion changes to a communication reservation process of executing, at a preset reservation time, a communication process for which the reception-side communication apparatus is set as a destination.

8. A communication apparatus comprising:
a retry notification portion configured to notify a transmission-side communication apparatus of a retry time period indicating a standby time period until retry of a communication process requested from the transmission-side communication apparatus, when the communication process is non-executable;

a first storage control portion configured to store identification information of the transmission-side communication apparatus which is a request source of the communication process, into a first storage portion when the communication process is non-executable;

a cancellation notification portion configured to notify the transmission-side communication apparatus corresponding to the identification information stored in the first storage portion, of cancellation of a non-executable state of the communication process when the non-executable state of the communication process is cancelled;

a second storage control portion configured to store a retry time period and identification information of a reception-side communication apparatus which is a destination of a communication process, into a second storage portion such that the retry time period and the identification information are associated with each other when the retry time period is received from the reception-side communication apparatus;

a communication prohibition portion configured to prohibit a communication process with, as a destination, the reception-side communication apparatus corresponding to the identification information stored in the second storage portion;

a first prohibition cancellation portion configured to cancel prohibition of the communication process by the communication prohibition portion when the retry time period elapses; and a second prohibition cancellation portion configured to cancel the prohibition of the communication process by the communication prohibition portion when cancellation of a non-executable state is notified of by the reception-side communication apparatus, wherein the communication prohibition portion prohibits retry of the communication process when the retry time period is received, and when both cancellation conditions in the first prohibition cancellation portion and the second prohibition cancellation portion are met, the first prohibition cancellation portion and the second prohibition cancellation portion retry the communication process retry of which is prohibited by the communication prohibition portion.

9. A communication apparatus comprising:

a second storage control portion configured to store a retry time period and identification information of a reception-side communication apparatus which is a destination of a communication process, into a second storage portion such that the retry time period and the identification information are associated with each other when the retry time period is received from the reception-side communication apparatus;

a communication prohibition portion configured to prohibit a communication process with, as a destination, the reception-side communication apparatus corresponding to the identification information stored in the second storage portion;

a first prohibition cancellation portion configured to cancel prohibition of the communication process by the communication prohibition portion when the retry time period elapses; and a second prohibition cancellation portion configured to cancel the prohibition of the communication process by the communication prohibition portion when cancellation of a non-executable state is notified of by the reception-side communication apparatus, wherein when predetermined cancellation information has been added to an INVITE message in SIP (Session Initiation Protocol) transmitted from the reception-side communication apparatus, the second prohibition cancellation portion determines that cancellation of the non-executable state has been notified of by the reception-side communication apparatus.

10. The communication apparatus according to claim 9, wherein the communication prohibition portion prohibits retry of the communication process when the retry time period is received.

11. The communication apparatus according to claim 10, wherein the first prohibition cancellation portion and the second prohibition cancellation portion retry the communication process retry of which is prohibited by the communication prohibition portion.

12. The communication apparatus according to claim 9, wherein the communication prohibition portion prohibits an input operation for setting the reception-side communication apparatus as a destination of a communication process.

13. The communication apparatus according to claim 9, wherein the communication prohibition portion changes to a communication reservation process of executing, at a preset reservation time, a communication process for which the reception-side communication apparatus is set as a destination.

14. The communication apparatus according to claim 13, wherein the communication prohibition portion sets the reservation time as unfixed.

15. A communication apparatus comprising:

a second storage control portion configured to store a retry time period and identification information of a reception-side communication apparatus which is a destination of a communication process, into a second storage portion such that the retry time period and the identification information are associated with each other when the retry time period is received from the reception-side communication apparatus;

a communication prohibition portion configured to prohibit a communication process with, as a destination, the reception-side communication apparatus corresponding to the identification information stored in the second storage portion;

a first prohibition cancellation portion configured to cancel prohibition of the communication process by the communication prohibition portion when the retry time period elapses; and a second prohibition cancellation portion configured to cancel the prohibition of the communication process by the communication prohibition portion when cancellation of a non-executable state is notified of by the reception-side communication apparatus, wherein the communication prohibition portion prohibits retry of the communication process when the retry time period is received, and when both cancellation conditions in the first prohibition cancellation portion and the second prohibition cancellation portion are met, the first prohibition cancellation portion and the second prohibition cancellation portion retry the communication process retry of which is prohibited by the communication prohibition portion.

16. A communication apparatus comprising:

a storage control portion configured to store a retry time period and identification information of a reception-side communication apparatus which is a destination of a communication process, into a storage portion such that the retry time period and the identification information are associated with each other when the retry time period is received from the reception-side communication apparatus;

a communication prohibition portion configured to prohibit a communication process with, as a destination, the reception-side communication apparatus corresponding to the identification information stored in the storage portion;

a first prohibition cancellation portion configured to cancel prohibition of the communication process by the communication prohibition portion when the retry time period elapses; and a second prohibition cancellation portion configured to cancel the prohibition of the communication process by the communication prohibition portion when cancellation of a non-executable state is notified of by the reception-side communication apparatus, wherein the communication prohibition portion changes to a communication reservation process of executing, at a preset reservation time, a communication process for which the reception-side communication apparatus is set as a destination, and when cancellation of the non-executable state is notified of by the reception-side communication apparatus, the second prohibition cancellation portion executes the communication process which is changed to the reservation communication process by the communication prohibition portion.

17. A communication system comprising a transmission-side communication apparatus and a reception-side communication apparatus, wherein the reception-side communication apparatus comprises:

a retry notification portion configured to notify the transmission-side communication apparatus of a retry time period indicating a standby time period until retry of a communication process requested from the transmission-side communication apparatus, when the communication process is non-executable;

a first storage control portion configured to store identification information of the transmission-side communication apparatus which is a request source of the communication process, into a first storage portion when the communication process is non-executable; and a cancellation notification portion configured to notify the transmission-side communication apparatus corresponding to the identification information stored in the first storage portion, of cancellation of a non-executable state of the communication process when the non-executable state of the communication process is cancelled, the cancellation notification portion adds cancellation information indicating cancellation of the non-executable state, to a header area of an INVITE message in SIP (Session Initiation Protocol), and transmits the INVITE message, the first storage control portion stores reception information including the identification information of the transmission-side communication apparatus and information of time and date when the INVITE message in SIP transmitted from the transmission-side communication apparatus was received, into the first storage portion, and then when the cancellation information is transmitted by the cancellation notification portion, the first storage control portion deletes the reception information corresponding to the transmission-side communication apparatus that is the destination of the cancellation information, from the first storage portion, and the transmission-side communication apparatus comprises:

a second storage control portion configured to store a retry time period and identification information of the reception-side communication apparatus which is a destination of a communication process, into a second storage portion such that the retry time period and the identification information are associated with each other when the retry time period is received from the reception-side communication apparatus;

a communication prohibition portion configured to prohibit a communication process with, as a destination, the reception-side communication apparatus corresponding to the identification information stored in the second storage portion;

a first prohibition cancellation portion configured to cancel prohibition of the communication process by the communication prohibition portion when the retry time period elapses; and a second prohibition cancellation portion configured to cancel the prohibition of the communication process by the communication prohibition portion when cancellation of a non-executable state is notified of by the reception-side communication apparatus.

\* \* \* \* \*